ANALOG SEGMENTATION APPARATUS

Filed July 27, 1966 4 Sheets-Sheet 1

INVENTORS:
GEORGE G. GORBATENKO
GERALD D. MILLER

BY Homer L. Kneal
AGENT

ANALOG SEGMENTATION APPARATUS

Filed July 27, 1966 4 Sheets-Sheet 2

ANALOG SEGMENTATION APPARATUS

United States Patent Office 3,500,324

Patented Mar. 10, 1970

3,500,324

ANALOG SEGMENTATION APPARATUS

George G. Gorbatenko and Gerald D. Miller, Rochester, Minn., assignors to International Business Machines Corporation, Armonk, N.Y., a corporation of New York Filed July 27, 1966, Ser. No. 568,271

Int. Cl. G06k *9/00*

U.S. Cl. 340—146.3 9 Claims

This invention relates to apparatus for separating touching characters in a character recognition system. Specifically, the apparatus of the invention implements an analog segmentation technique whereby an analog video signal from the scanner is directly operated on to determine a true or natural segmentation point independent of the digitized or quantized video. The segmentation point is the point where adjacent characters may be optimumly separated so as to enable recognition of both characters.

In character recognition systems, the segmentation apparatus normally segments characters by the natural segmentation algorithm of looking for white area between the characters. In the typical system, scanning of the characters is accomplished by moving the scanning beam in multiple paths transverse to the line of characters. The video signal resulting from each scan through the character is digitized by a threshold detector. The threshold detector is set to a given level to interpret video signals above the level as black bits and video signals below the level as white bits. Natural segmentation is generally achieved in this system when, in a given scan, no black bits are detected.

The problem with segmentation arises when there is a touching character condition. Touching characters occur in character recognition systems in two situations. First, they occur when two characters are connected by a smudged or gray area instead of the normal white background. Second, they occur when two characters are printed on a document in improper positions so that portions of the characters overlap. The quantized natural segmentation criteria will no longer be satisfied because the optimum point for separation of characters will be interpreted by the digital system as containing black bits. When the characters overlap, the threshold detector finds black bits in every scan as it moves from character to character. When the characters do not overlap but the area between them is smudged, the threshold detector may or may not detect black bits in the scan between the characters. If the threshold level of the detector is set too low, then the smudged area will be interpreted as black bits, and therefore, the natural segmentation point is not recognized. If the threshold level of the detector is set high, the smudged area between the characters can be properly detected as white bits. However, a high threshold level will also ignore correct black areas when the scanning beam is passing through a character and thereby reduce the capability of the recognition system to recognize the character.

Prior art digital systems have attempted to solve the problem of segmenting touching characters by supplementing the natural segmentation detection with complex apparatus based on unnatural segmentation algorithms. Generally, this complex apparatus counts the black bits during scans and looks for specified ratios based on geometric patterns typical of touching characters. The effectiveness of this technique is limited because there still remain many touching character situations which do not properly satisfy the unnatural segmentation algorithms.

The basic limitation on the digital segmentation system is that it is dependent upon a threshold detector to digitize or quantize the analog signal. Therefore, analog signals from smudged areas which it should properly interpret as white bits will often be erroneously interpreted as black bits. As a result, digital segmentation apparatus is forced to work with erroneous information and must provide complex apparatus to work around the errors due to quantization.

It is the object of our invention to improve the detection of touching characters in a character recognition system.

It is a further object of our invention to detect the natural or analog minimum representing the gray area digitized to black between touching characters.

It is a further object of our invention to detect a null in video signals indicative of the segmentation point between touching characters by monitoring with an analog system the analog video signal.

In accordance with this invention, the above objects are accomplished by analog segmentation apparatus which analyses the analog video signal, before it is quantized or digitized, and thereby looks for a true or natural minimum. The segmentation apparatus integrates the analog video signal from each scan and thereby stores an integrated value indicating how much darkened area was crossed by the scan. Comparison apparatus is provided to compare the integrated values of successive scans. The comparators generate a signal indicating from scan to scan whether the integrated values are increasing or decreasing. The comparison signals are monitored to detect when successive decreasing indications are followed by successive increasing indications. This pattern is indicative of the integrated values passing through a minimum and thereby indicative of the minimum dark area or natural segmentation point between touching characters. Thus, when this pattern is detected, a signal may be generated to segment the touching characters so that each character may be separably recognized.

The great advantage of our invention is that it utilizes the analog video signal when determining the separation or segmentation point between touching characters. Furthermore, our inventive apparatus is not susceptible to variations in darkness of characters because it looks for a true minimum. There is no threshold detection so variations in analog video signal strength do not effect segmentation by our apparatus. Furthermore, our system requires relatively few circuit elements and in fact, may be implemented with about one-tenth the number of components required to implement contemporary digital segmentation systems.

The foregoing and other objects, features and advantages of the invention will be apparent from the following more particular description of the preferred embodiments of the invention, as illustrated in the accompanying drawings.

Figure 1:
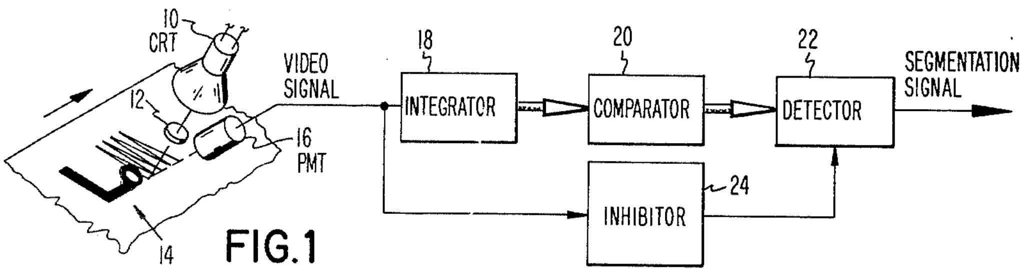
FIG. 1 shows the general arrangement of elements in the invention.

Now referring to FIG. 1, the general arrangement of the inventive apparatus is shown. The scanning system consists of a cathode ray tube 10, a lens 12 to focus light from the cathode ray tube into a beam for scanning characters 14. Photomultiplier tube 16 then picks up the variations in light intensity reflected back from the characters 14. The output of the photomultiplier tube 16 is the analog video signal which may be analyzed to identify the characters scanned. To facilitate identification and recognition, the inventive apparatus segments characters or, in other words, separates touching characters.

To understand how segmentation is achieved, it is necessary to understand how the scanning means operates. The beam of light produced by the combination of the cathode ray tube 10 and lens 12 is moved along a scanning path transverse to the line of characters being scanned. The scanning beam passes vertically across a character many times and is shifted a small horizontal distance between each vertical scan. Thus, there may be as many as twenty vertical scans, for example, during the process of scanning a single character. The number of scans per character is irrelevant to the invention. Likewise it is immaterial whether an electro-optical system such as that shown or some other system for sensing marks is used to produce an analog signal which may be used for identification of characters scanned.

In the preferred embodiment of our invention, the number of scans per character is accumulated and when three-fourths of a character has been scanned as determined by a scan count, the segmentation apparatus is activated to detect when one character ends and another character starts. For example, if there were twenty scans per character, the segmentation apparatus would not be activated until after the first fifteen scans. This serves to reduce the susceptibility of a false segmentation signal due to geometry of characters or noise. In this description, the first 75% of a character is referred to as Area 1 and the remaining portion of the character, during which the segmentation apparatus is active, is referred to as Area 2.

The segmentation apparatus per se consists of integrator 18, comparator 20 and detector 22. Integrator 18 integrates the video signal from each scan and stores or holds the integrated value for use by the comparator 20. Comparator 20 compares the integrated values from successive scans and determines from scan to scan whether the integrated values are increasing or decreasing. The comparator 20 generates a comparison signal for each comparison between two successive scans. If the scan second in time has an integrated value lower than the scan first in time, the comparison signal will indicate decreasing integrated values. Of course, if the integrated value of the second scan had been greater than the integrated value of the first scan, the comparison would have indicated increasing integrated values. Detector 22 receives the comparison signals from comparator 20 and looks for a pattern indicating the integrated values have fallen to a minimum and then risen.

In the preferred embodiment, the detector generates an output signal if it receives comparison signals indicating two successive decreases followed by an increase. This pattern has been determined as being the optimum for indicating a true minimum without being overly burdensome as to hardware. Of course, as will be clear later on, with additional hardware, the detector could look for many successive decreases followed by many successive increases and thereby more reliably locate the minimum and thus the natural segmentataion point. The pattern of two decreases followed by an increase which is used in the preferred embodiment, may also be produced by successive scans through a character having an enclosed white area. The inhibitor 24 is provided to detect when the video signal represents the signal from an enclosed white character. Since the enclosed white character may cause an improper segmentation signal to be generated by the detector 22, the inhibitor blocks any output from the detector until the area of enclosed white has been passed. Thereafter, the segmentation apparatus is permitted to function.

Figure 2:
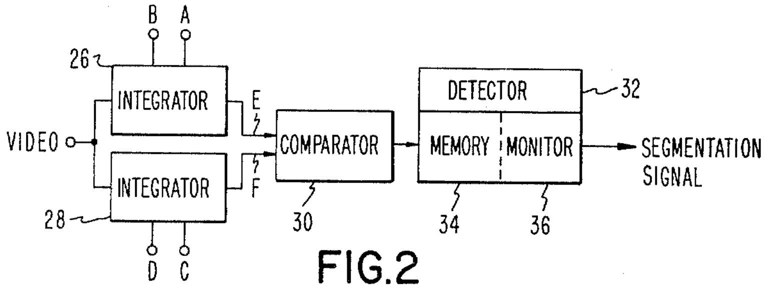
FIG. 2 shows one of the preferred embodiments of the invention utilizing two integrators, a single comparator and a detector with a memory.

One specific embodiment of the invention is shown in FIG. 2. Integrators 26 and 28 are gated alternately to integrate and hold the integrated value of successive, alternate scans. In other words, integrator 26 integrates and holds the value for odd numbered scans, while integrator 28 integrates and holds the value for even numbered scans. Comparator 30 then compares the integrated value of the scan stored in integrator 26 with the integrated value of the scan stored in integrator 28. The comparison signal generated by the comparator indicates whether the integrated value decreased or increased in the two successive scans.

Detector 32 includes two separate functioning devices, a memory 34 and a monitor 36. The memory 34 stores three successive comparison signals received from comparator 30. Monitor 36 continuously watches the contents of the memory and when the three comparison signals indicate the integrated values have decreased twice in succession and then risen, the monitor generates a segmentation signal. The structure and operation of detector 32 will be discussed in more detail in reference to FIGS. 4 and 5.

Figure 3:
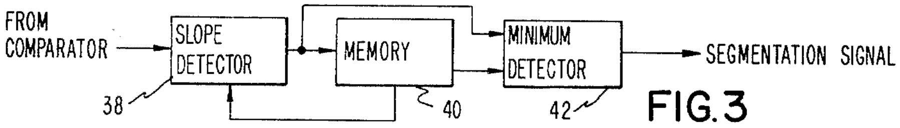
FIG. 3 shows an alternative embodiment for the detector in FIG. 2.

An alternative configuration for the detector 32 (FIG. 2) is shown in FIG. 3. Slope detector 38 looks for successive comparison signals indicating two successive decreases or two successive increases. Whether the detector 38 is looking for decreases or increases depends upon the control signal it receives from memory element 40. Initially, the memory element 40 is empty and slope detector 38 is looking for negative slope signals, comparison signals indicating decreasing integrated values. When slope detector 38 detects two successive negative slope signals, the negative slope indication is stored in memory 40. Memory 40 then gates the slope detector 38 to look for positive slope signals, comparison signals indicating increasing integrated values. When the slope detector 38 detects two positive slope signals, it generates a positive slope indication. Minimum detector 42 receives the negative slope indication from the memory 40 and the positive slope indication from the slope detector 38 and thereby detects the presence of a minimum. Upon detecting the minimum, the minimum detector 42 generates a segmentation signal. The operation and structure of the detection configuration in FIG. 3 will be discussed in more detail shortly with reference to FIG. 6.

Figure 4:
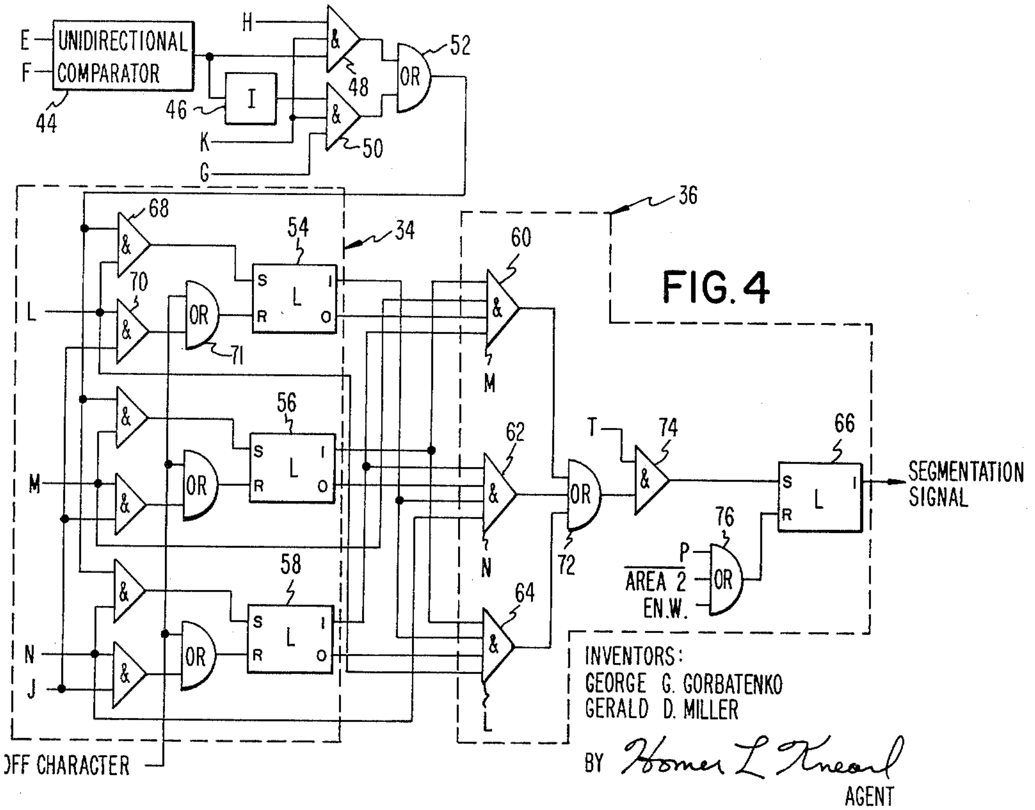
FIG. 4 shows the comparator and detector of FIG. 2 in detail.

To better understand the operation and structure of comparator 30 and detector 32 of FIG. 2, reference is now made to FIG. 4. Comparator 30 comprises, in FIG. 4, the unidirectional comparator 44, inverter 46, AND gates 48 and 50 and OR gate 52. The unidirectional comparator 44 acts to generate output signals only if the input applied to input terminal E is greater than the input applied to input terminal F. The purpose of inverter 46 and AND gates 48 and 50 is to generate an up output signal out of OR gate 52 when the difference between the two integrated values compared represents a decrease.

The memory part of detector 32 (FIG. 2) comprises in FIG. 4 latches 54, 56 and 58 plus gating circuitry to gate every third comparison signal to the same latch.

The monitor of detector 32 (FIG. 2) comprises in FIG. 4 AND gates 60, 62 and 64 and in addition, latch 66. Each of the AND gates 60, 62 and 64 responds to the condition of two successive decreases followed by an increase. When comparison signals representing this succession of conditions is stored in the latches 54, 56 and 58, one of the AND gates 60, 62 or 64 will generate an output. The output from the AND gate sets latch 66 and thereby generates the segmentation signal.

Figure 5:
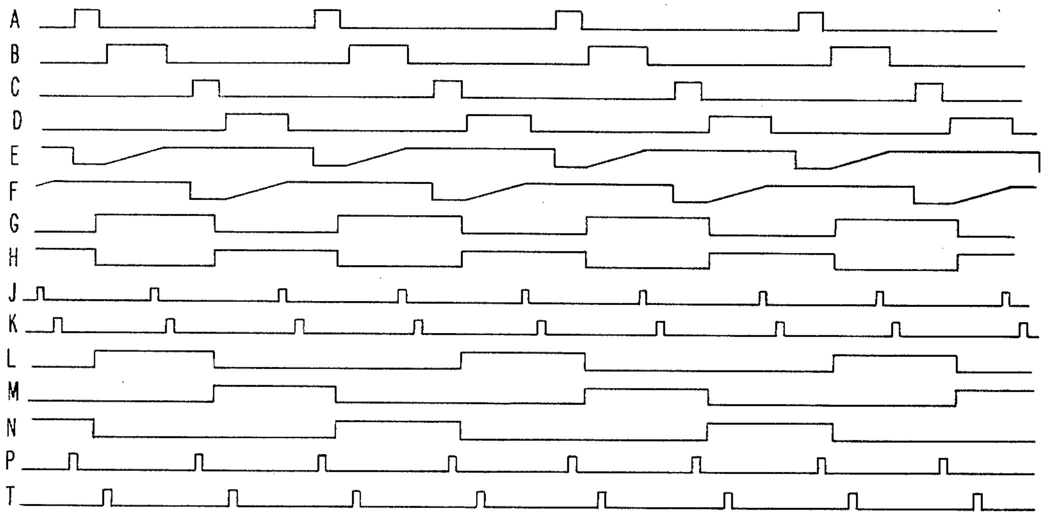
FIG. 5 shows timing signals used in the various embodiments of the invention.

To understand the operation of the apparatus represented by FIGS. 2 and 4, and also to understand the gating of this apparatus, reference should be made to the timing diagram in FIG. 5, in addition to FIGS. 2 and 4 during the following operative description. The waveforms shown in FIG. 5 are identified by alphabetic letters. The same alphabetic letters indicated in FIGS. 2 and 4 where the waveforms occur in the system diagram. The first two signals in FIG. 5, A and B, control the operation of integrator 26. Signal A erases the information in integrator 26 by discharging a capacitor which stores the integrated value. The integrator is turned on to the integrate mode by signal B. Similarly, integrator 28 has its integrated value erased by waveform C and is turned on to the integrate mode by waveform D. Examining waveforms A, B, C and D in composite, integrator 26 is reset by waveform A, stores the signal from a scan when triggered by waveform B and holds the integrated value from that scan. Meanwhile, integrator 28 is reset by waveform C and then activated by waveform D to integrate the next scan. Thereafter, this pattern is repeated so that integrators 26 and 28 alternately operate to integrate the video signal from successive scans. A representation of the integrated values of integrators 26 and 28 is shown in FIG. 5 as waveforms E and F. Waveforms E and F are shown for purposes of illustrating timing, and their relative amplitudes in FIG. 5 have no significance; normally their amplitudes are different.

The remaining waveforms in FIG. 5 appear at points in the system shown in FIG. 4. The unidirectional comparator 44 operates constantly to compare the input signals E and F and generates an output signal of constant amplitude when signal E is greater than signal F. Signals G and H are gating signals which bias AND gates 48 and 50 to alternately pass a signal.

Signal H occurs when the unidirectional comparator has just received a new integrated value on the F terminal. Therefore, if E is greater than F, since F represents the most recent scan, the output signal from the comparator 44 will indicate that the integrated value is decreasing. At the time a pulse from waveform K arrives, this indication is passed through AND gate 48 to OR gate 52. The pulse output from OR gate 52 indicates the integrated values are decreasing. During the next scan, the unidirectional comparator 44 receives a new integrated value on input E. If the integrated values are still decreasing, then F will be greater than E and the unidirectional comparator will have no output. Inverter 46 will then generate an output signal. Gating signal G and the output signal from inverter 46 bias AND gate 50 so that pulse K is passed by AND gate 50 and collected by OR gate 52. Again the pulse output from OR gate 52 indicates decreasing integrated values. The operation of the unidirectional comparator 44 with logic gates through OR gate 52 may be summed up by saying that if the integrated values are decreasing from scan to scan, a positive pulse will appear at OR gate 52.

To store the comparison signals, latches 54, 56 and 58 are each gated every third scan by waveforms L, M and N. Each of these waveforms are UP during a different scan and thus define separate scan periods. Latch 54 is typical of the operation. AND gates 68 and 70 are gated to pass signals by waveform L which occurs every third scan. AND gate 70 passes the reset signal J which resets the latch 54 in preparation for storage of a new comparison signal. AND gate 68 passes the new comparison signal which is generated at the time corresponding to the pulse of waveform K. If there were a decrease in integrated values, there will be a pulse at time K which sets the latch 54. On the other hand, if there were an increase in integrated values, AND gates 48 and 50 will not have an output and no pulse at time K is present to set the latch 54. Therefore, latch 54 remains reset and thus represents an increase in integrated values. The latch 54 may be purposely held reset by the OFF CHARACTER signal via OR gate 71. The OFF CHARACTER signal occurs when the scanning beam is between characters or when a segmentation signal has been generated. Latches 56 and 58 operated identically to latch 54 except that their associated AND gates are gated by the waveforms M and N.

To monitor the contents of the latches, AND gates 60, 62 and 64 receive input signals from the latches. In addition, the AND gates are also gated every third scan by the waveforms L, M and N just as the latches were gated every third scan. AND gate 60 will be examined specifically as an example of the operation of the AND gates. Assume that latches 56 and 58 have been set in the previous two scans indicating that the comparator detected two successive decreases. In the scan period L, assume that the comparator detected an increase and that, therefore, latch 54 was not set. Accordingly, at the end of scan period L, all of the inputs at AND gate 60 are UP except the M waveform input. When the M scan period begins, (the M waveform comes up) AND gate 6 immediately generates an output signal which lasts until pulse J resets latch 56. AND gates 62 and 64 operate in a similar manner when they receive the proper signals from the latches and the L and N waveforms. The waveforms L, M and N are applied to the AND gates 60, 62 and 64 to prevent random combinations from satisfying the AND gate conditions. An output from the AND gates 60, 62 and 64 means that the comparator has generated three successive comparison signals representing two successive decreases followed by an increase.

Since an output from AND gates 60, 62 or 64 represents a minimum in the integrated values, the output is used to generate a segmentation signal by setting latch 66. To set latch 66, the output biases AND gate 74 through OR gate 72. Pulse T early in the scan period is passed by AND gate 74 to set latch 66. At the end of the previous scan period, latch 66 has been reset by the pulse waveform P which is applied to the reset terminal via OR gate 76. In addition, latch 66 is held in a reset condition if, first, the scanning beam has not yet entered Area 2 of the character (the last 25%), or second, an enclosed white inhibit signal is received from the enclosed white inhibitor 24 (FIG. 1). However, if the scanning beam is in the last 25% of the character and there is no enclosed white indication, then output from the AND gates through the OR gate 72 will set latch 66. With latch 66 set, its output serves as a segmentation signal.

Figure 6:
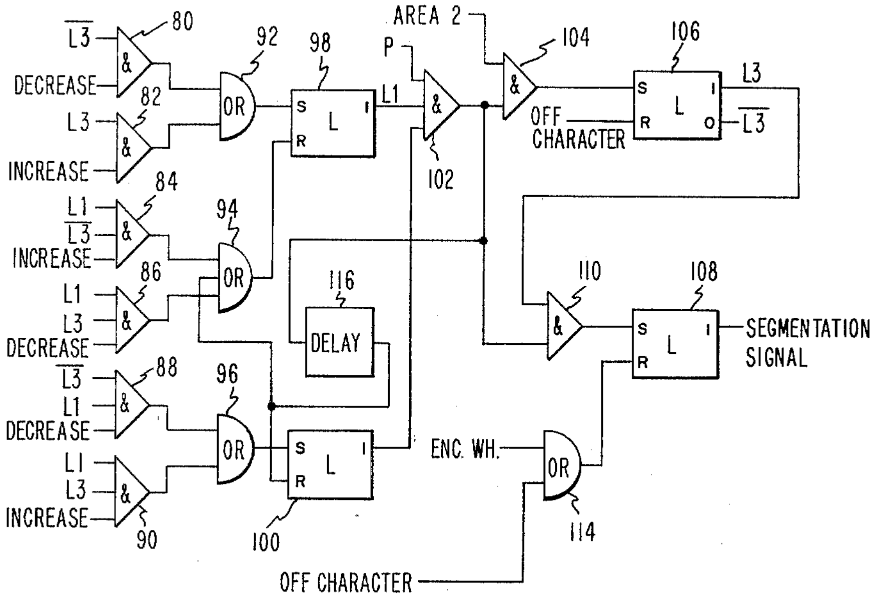
FIG. 6 shows the detection configuration of FIG. 3 in more detail.

An alternative embodiment for detector 32 in FIG. 2 as discussed and shown in FIG. 3 is specifically shown in FIG. 6. The alternative detector embodiment in FIG. 6 requires as inputs a signal on a first line when the comparison signal represents an increase and a signal on a second line when the comparison signal represents a decrease. The generation of these signals on two separate lines can be simply achieved by using the comparison circuitry in FIG. 4 with the addition of an inverter. To review, the comparison circuitry of FIG. 4 includes the functional blocks from unidirectional comparator 44 through OR gate 52. The output of OR gate 52 is an up signal representing a decrease in integrated values. By simply adding a second line to the output of OR gate 52 and placing an inverter in the second line, a comparison signal which is up, when there is an increase in integrated values, can be generated. Thus, in FIG. 6, the inputs denoted as decrease in AND gates 80, 86 and 88 are from the OR gate 52. The inputs denoted as increase in AND gates 82, 84 and 90 are from the inverted input signal from OR gate 52.

To coordinate the functional diagram of FIG. 3 with the logic blocks of FIG. 6, the slope detector of FIG. 3 consists of AND gates 80–90, OR gates 92, 94 and 96, latches 98 and 100 and AND gate 102. The memory 40 in FIG. 3 corresponds to AND gate 104 and latch 106. Finally, the minimum detector 42 in FIG. 3 corresponds to latch 108 and its associated input logic gates 110 and 114 in FIG. 6.

In operation, the memory latch 106 is initially reset by the OFF CHARACTER signal. The OFF CHARACTER signal occurs, as previously stated, when the scanning beam is between characters or when a segmentation signal has been generated. The OFF CHARACTER signal also resets latch 108 in the minimum detector so that latch 108 is promptly reset at the end of a character.

When a character is being scanned, the slope detection latches 98 and 100 are initially looking for successive decrease signals. This selection is achieved by feeding back the zero output or $\overline{L3}$ from latch 106 to the inputs of AND gates 80, 84 and 88. In other words, when latch 106 is reset the only AND gates which will pass signals to latches 98 and 100 are AND gates 80, 84 and 88. If the first signal were a decrease, AND gate 80 would pass the signal via OR gate 92 to set latch 98. Setting latch 98 would permit AND gate 88 via OR gate 96 to pass the next decrease signal to set latch 100. However, if the next signal were an increase, AND gate 84 which is also activated by setting latch 98, would pass the increase signal via OR gate 94 to reset latch 98. Thus, the only way latch 98 and latch 100 may be both set is to have two successive decrease signals received from the comparison circuits. If this succession of events does occur, then AND gate 102 at pulse P time (FIG. 5) detects that latches 98 and 100 are both set and generates a signal indicating two decreases and hereafter called a negative slope. This negative slope signal will set latch 106 if the scanner is in Area 2 of the character (the last 25%). The purpose of AND gate 104 is merely to permit the detection circuitry to operate during the last one-quarter of the character. While latch 106 is being set, the negative slope signal is delayed by delay 116 and used to reset latches 98 and 100. Once latch 106 has been set, AND gates 82, 86 and 90 may pass signals, and AND gates 80, 84 and 88 are inhibited.

With AND gates 82, 86 and 90 now activated, the latches 98 and 100 are ready to look for two successive increase signals. If an increase signal is received, AND gate 82 gates it via OR gate 92 to set latch 98. Then latches 86 and 90 are activated so that if a second increase signal is received latch 100 will be set but if a decrease signal is received, latch 98 will be reset. Thus, latches 98 and 100 will both be set only when two successive increases have been received. AND gate 102 at pulse P time detects that both latches have been set and generates a signal representative of two increases and hereafter called the positive slope signal.

The minimum detector latch 108 is used to generate the segmentation signal. Latch 108 is set when AND gate 110 indicates that it is receiving both a negative slope signal from latch 106 and a positive slope signal from AND gate 102. Latch 108 will then maintain its set condition until reset by an OFF CHARACTER signal. OR gate 114 is provided so that the latch 108 may be held reset in the event the enclosed white inhibit signal is present. As stated earlier, the enclosed white inhibit signal is used to block improper segmentation signals which have been generated because the scanned character contained an enclosed white area.

Figure 7:
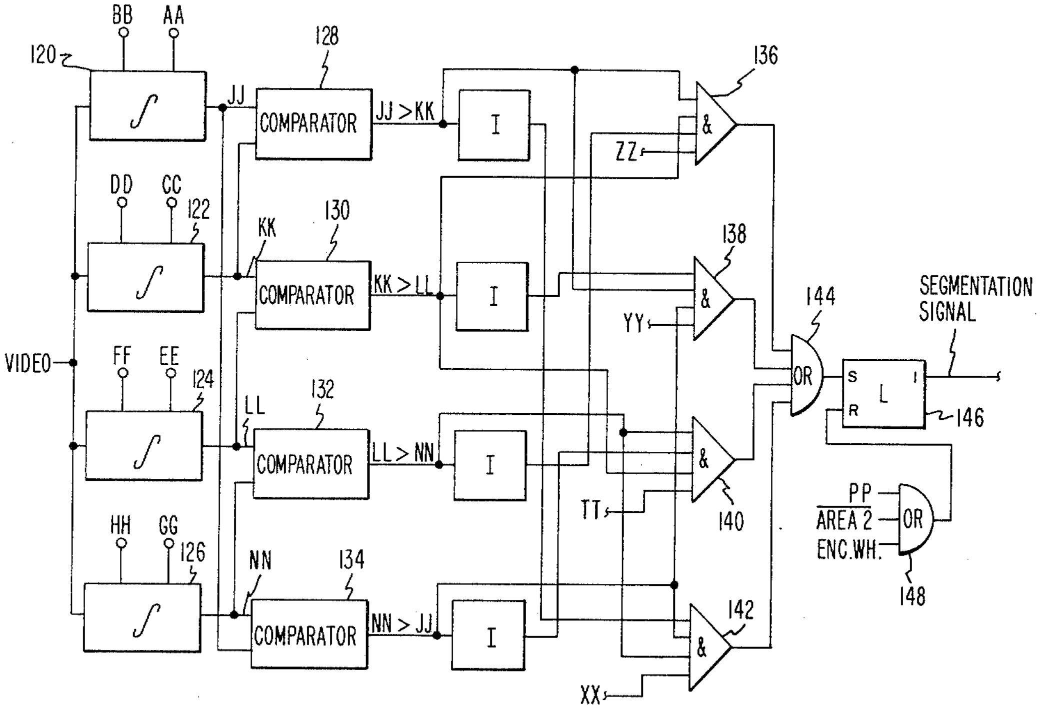
FIG. 7 shows another preferred embodiment of the invention wherein there is a parallel arrangement of integrators, comparators and detectors.
Figure 8:
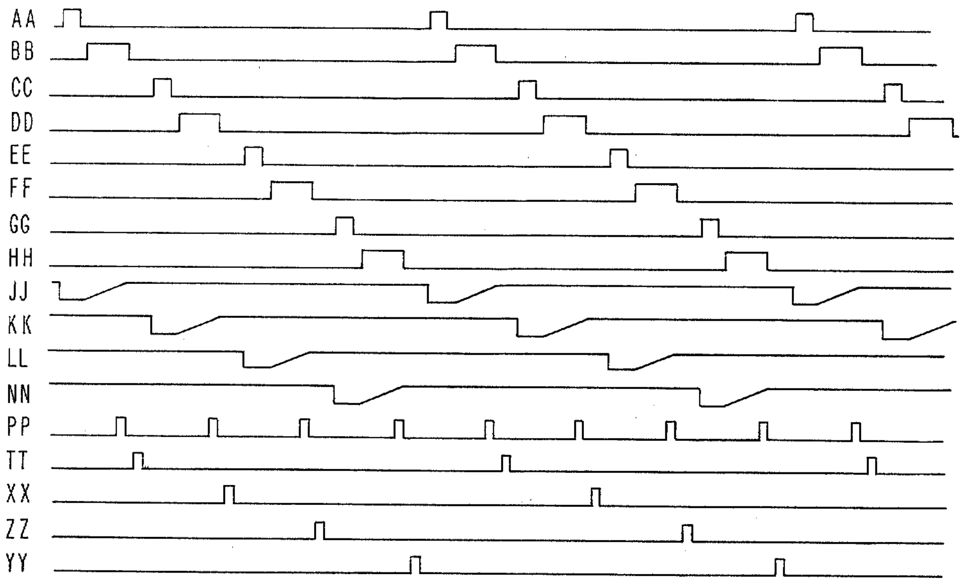
FIG. 8 shows the timing signals used in the embodiment of FIG. 7.

While the above descriptions of two embodiments have dealt with substantially serial systems using a single comparator, our invention may also be implemented by a system using parallel integrators, comparators, and detectors. To understand the parallel embodiment, reference is now made to FIG. 7, showing the structure for a parallel system and to FIG. 8 showing the waveforms in the parallel system of FIG. 7. The waveforms in FIG. 8 are identified with alphabetic letters; the same letters show where the waveforms occur in the structure of FIG. 7.

The purpose of integrators 120, 122, 124 and 126 in FIG. 7 is to integrate four successive scans and hold their integrated values for use by the comparators. The comparators 128, 130, 132 and 134 compare the integrated values from two successive scans. Each comparator generates either no output or a constant amplitude output depending on which of its input signals is the larger. If the input signal from the most recent scan is the smaller input signal, the comparator output is up and thus indicative of a decrease in integrated values. An inverter is attached to the output of each comparator to generate a signal representing an increase in integrated values when the input signal from the most recent scan is the larger input signal. AND gates 136, 138, 140 and 142 detect when successive increase and decrease signals indicate the integrated values have passed through a minimum. The output from any AND gate is passed by OR gate 144 to set latch 146. When latch 146 is set, its output is the segmentation signal.

In operation, each of the integrators 120–126 operate serially in time to integrate the video signal from every fourth scan. The serial operation of the integrators is controlled by the waveforms AA through HH, shown in FIG. 8. Of these waveforms, the pulse signals of short duration are erase signals and the longer duration pulse signals are integrate signals. The operation of the integrators when gated by these signals is the same as that discussed with regard to the integrators in FIG. 2, except that each integrator here is operating every fourth scan instead of every other scan. The output of the integrators is shown in the FIG. 8 as waveforms JJ, KK, LL, and MM. Note that at the end of every scan period, just before the next erase pulse, all of the integrators contain an integrated value which the comparators may operate on.

Comparators 128, 130, 132 and 134 operate on two successive scans to generate the decerase or increase signals. The purpose of the comparator is, of course, to compare two successive scans. However, at the end of a given scan, only three of the comparators are performing this function. The fourth comparator is comparing the most recent scan with a scan three scans earlier and therefore, the output from this fourth comparator is meaningless. As an example, assume that integrator 122 has just been erased and has integrated a video signal from a new scan. The output of comparators 132, 134 and 128 is still the valid comparison of two successive scans. However, the output from comparator 130 represents the comparison of the new scan with a scan three scans earlier stored in integrator 124. Thus, the output from comparator 130 does not represent useful information. During any given scan, the selection of comparator outputs with meaningful information is accomplished by AND gates 136, 138, 140 and 142.

To detect when the integrated values have passed through a minimum, each of the AND gates 136, 138, 140 and 142 are set to respond to two successive decreases followed by an increase as indicated by the comparison signals. These detection conditions might erroneously be filled by the fourth comparator in a given scan, which generates the meaningless output. To avoid this, each AND gate is gated by a timing signal which effectively activates the AND gate only in the scan period when it could possibly detect a minimum. In the example of the previous paragraph, where integrator 122 just received new information, timing pulse XX is used to activate AND gate 142. In this scan period, the only meaningful output would be in the event that the output from comparators 132 and 134 is a decrease signal and the output from comparator 128 is an increase signal. AND gate 142 detects these three conditions and is activated by pulse XX to generate an output signal. This output signal from AND gate 142 is passed by OR gate 144 to set latch 146. When latch 146 is set, its output is the segmentation signal. Latch 146 is reset by OR gate 148 during every scan period by pulse PP. In addition, latch 146 may be held reset when the scanner is in the first 75% of the character or when even in the last 25% of the character, if the enclosed white inhibit signal is present.

To illustrate the necessity for the timing signals TT through ZZ, assume in the above example that the new integrated value KK in integrator 122 is less than the integrated value JJ. Therefore, the output from comparator 128 would be a decrease signal. However, comparator 130 comparing the new KK with the old LL signal would appear to see an increase and would accordingly generate an increase signal. The pattern of a decrease signal from comparators 134 and 128 and an increase signal from comparator 130 would satisfy AND gate 138 but for the timing signal YY. The timing signal YY is UP only during the scan period when integrator 124 integrated a signal from a new scan. This is the only scan period when a valid minimum in the integrated values is represented by decrease signals from comparators 128 and 134 and an increase signal from comparator 130. Therefore, by using the timing signals TT through ZZ, the AND gates 136–142 will only respond to comparison signals that indicate a true minimum. The timing signals effectively block the erroneous comparison signal in every scan from generating an improper segmentation signal.

Figure 9:
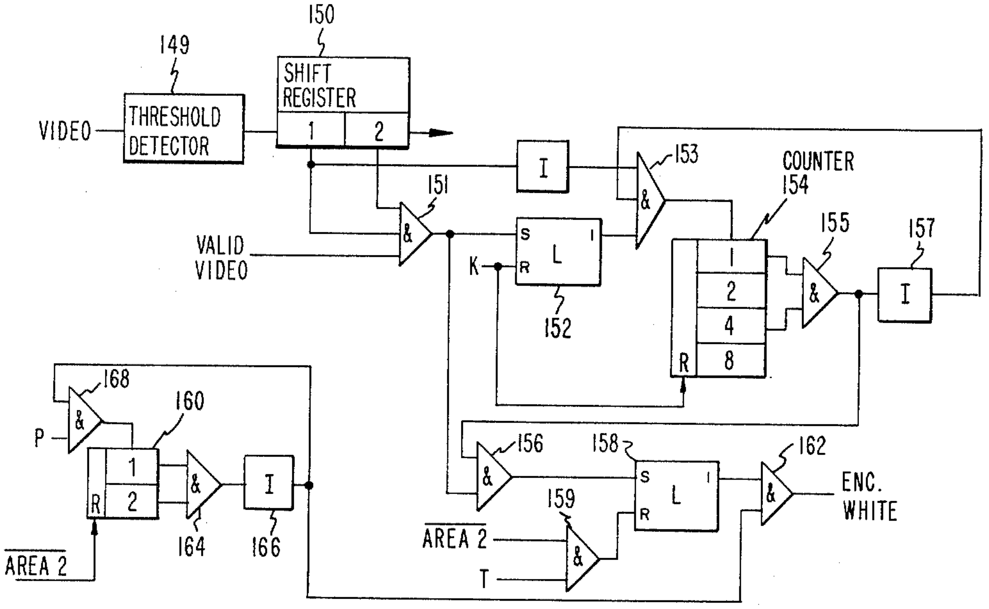
FIG. 9 shows the details of the enclosed white inhibitor of FIG. 1.

Referring now to FIG. 9, a specific embodiment of the enclosed white inhibitor 24 (FIG. 1) is shown. In the inhibitor, the video signal is detected on a bit by bit basis during each scan. In the preferred embodiment, the video signal contains 32 information bits per scan and seven bits per scan during which the scanning means is positioned for the next scan. If the scanning beam intersected a portion of the character during a bit time, that bit is a one; on the other hand, if the scanning beam is a bit interval does not intersect a portion of the character, the bit is a zero. In other words, a one bit normally represents black area and a zero bit normally represents white area.

In the inhibitor, shift register 150 converts the serial video signal to a parallel signal. Latch 152 indicates when two successive black bits have been received. Counter 154 responds to latch 152 and single video bits to count the number of white bits received after two black bits. If five successive white bits are received after two successive black bits, the counter is locked up and biases AND gate 156 to look for two successive black bits. If two successive black bits then arrive, the output from AND gate 156 sets latch 158 whose output indicates that a character having enclosed white is being scanned.

The purpose of counter 160 and its associated logic is to count three scans as the scanning beam enters Area 2 of the character. During these three scans, the enclosed white inhibit signal can pass through AND gate 162. Thereafter the enclosed white inhibit signal is not permitted to reach the detector. This permits the detector 22 (FIG. 1) to generate a segmentation signal at the very end of the enclosed white character after the enclosed white portion of the character.

In operation, the video signal is digitized by threshold detector 149 and sent serially bit by bit to shift register 150. AND gate 151 generates an output signal when two successive black bits appear in shift register 150. The valid video condition activates the AND gate 151 only during the 32 bit interval of information and inhibits the gate during the seven bit repositioning interval. Thus, if during valid video, two black bits are detected by AND gate 151, latch 152 is set. Latch 152 has been reset by pulse K (FIG. 5), which occurs during the seven bit repositioning interval of the scan beam during each scan period. This pulse K also resets the counter 154 at the end of every scan period. If the latch 152 is set by detection of two black bits, it activates AND gate 153. AND gate 153 then watches for white bits from the first stage of shift register 150. Each white bit passed by AND gate 153 is counted by counter 154. When five white bits have been counted, AND gate 155 detects the presence of a five count and by means of invertor 157 inhibits AND gate 153 from passing further bits to the counter 154. This effectively locks the counter 154 at a five count. The five count signal is then used to activate AND gate 156. To briefly review, AND gate 156 will not be activated then until the video signal from a single scan has contained two successive black bits followed by five white bits. AND gate 156 then responds to AND gate 151 to look for two more successive black bits. If two successive black bits then arrive, it indicates that the scan has crossed the enclosed white area of a character. Therefore, the output from AND gate 156 is used to set latch 158 whose output represents an enclosed white character. Latch 158 has been reset at the beginning of every scan outside of Area 2. This is accomplished by AND gate 159. Once in Area 2, latch 158 is set if there is enclosed white during any scan and remains set until the scan of the next character is begun. Latch 158, in addition to being active to store an enclosed white indication during Area 2, also stores the same indication if it occurs on the scan immediately precedant to Area 2. This occurs because the pulse T once the Area 2 signal arrives is not passed by AND gate 159 to reset latch 158. Therefore, latch 158 may contain an enclosed white indication from the scan which just precedes the Area 2 portion of the character.

To provide the enclosed white inhibit signal only during the early part of Area 2, AND gate 162 is provided. Normally, the AND gate 162 is biased to pass the enclosed white indication from latch 158. However, the enclosed white inhibit indication will only be used to inhibit detector 22 (FIG. 1) after the scanner is moving across the Area 2 portion of the character. When not in the Area 2 portion of the character, the detector has been held inhibited by its own circuitry. After entering Area 2, the counter 160 is no longer reset and begins counting the P pulses (FIG. 5) which occur once every scan period. When the counter has counted three pulses, AND gate 164 generates an UP signal which is inverted by inverter 166. The output of the inverter is now down and blocks any further passage of enclosed white inhibit signals through AND gate 162. The output of the inverter is also fed back to AND gate 168 to block further passage of P pulses to the counter, and thereby lock the counter at a three-count until reset by $\overline{\text{Area 2}}$ signal.

To summarize the timing of the enclosed white inhibit signal, it is generated by latch 158. Latch 158 will generate an enclosed white inhibit signal if enclosed white detection occurs during the Area 2 scans, or during the first scan before Area 2. The enclosed white inhibit indication is passed by AND gate 162 until the gate is turned off by counter 160 after three scan periods in Area 2. Thus, the enclosed white inhibit signal can be passed out of AND gate 162 during the first scan previous to Area 2 through the first three scans in Area 2. Thereafter, the enclosed white inhibit signal is blocked and the detection circuits are permitted to generate a proper segmentation signal during the last few scans of the character. The reason for limiting the inhibit to three scans of Area 2 is that after three scans, the enclosed white area of the character should have been passed by the scanner and therefore, there is no longer any possibility of an improper segmentation signal. Of course, if the number of scans per character were changed, it may be necessary to change also the number of scans during which the enclosed white inhibit signal will block operation of detector 22 (FIG. 1).

Figure 10:
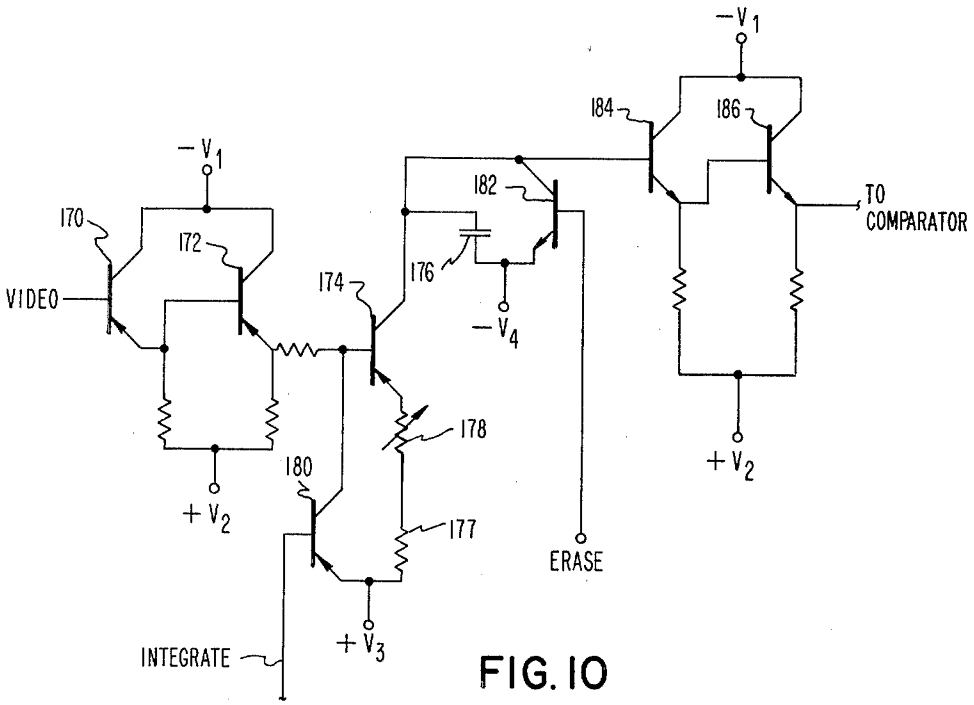
FIG. 10 shows the circuit schematic for the integrators used in the several embodiments.

To implement the integrator functional blocks shown in the several embodiments of the invention, the circuit in FIG. 10 may be used; however, many other integration circuits could be substituted without departing from the essence of our invention. Referring to FIG. 10, transistors 70 and 172 are emitter followers which are biased into an operative condition by voltages $+V_2$ and $-V_1$. The purpose of the emitter followers is to amplify the video signal while maintaining isolation between the scanning means and the RC integrating network. The integration is accomplished by use of transistor 174 as a current source to apply charge to capacitor 176. The rate of integration is controlled by resistors 177 and 178, the latter being manually adjustable. Transistor 174 is biased by voltage $+V_3$ and turned on and off by transistor 180.

So long as a voltage lower than V3 is applied to transistor 180, transistor 174 is held turned off. However, when voltage applied to the base of transistor 180 rises above voltage $+V_3$ and turns transistor 180 off, the video signal amplified from transistor 172 modulates the current applied by transistor 174 to the capacitor 176. To erase the integrated value stored in capacitor 176, transistor 182, which is normally held turned off, is turned on by raising the voltage on its base above V4. Transistor 182 then saturates and discharges capacitor 176. The integrated value on capacitor 176 is amplified by transistors 184 and 186 acting as emitter followers. The output from transistor 186 is applied to a comparator.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Analog segmentation apparatus for separating touching characters to facilitate the recognition of characters in a character recognition system comprising:

scanning means for scanning a line of characters with multiple scans transverse to the line of characters and for generating an analog signal for each scan, the analog signal having a different amplitude when the scanning means is crossing a portion of the character than when crossing background;

integrating means for integrating separately analog signals from separate scans and for storing the integrated values of the scans until reset to receive analog signals from additional scans;

comparing means responsive to said integrating means for comparing the integrated values from successive scans and for generating comparison signals indicative of whether the integrated values are increasing or decreasing;

detecting means responsive to said comparison means for detecting from the comparison signals a pattern of decreasing integrated values followed by increasing integrated values and for thereupon generating a segmentation signal.

2. Segmentation apparatus comprising the apparatus of claim 1 and in addition:

inhibiting means for determining when the analog signal represents the portion of a character whose integrated values from successive scans normally indicate a false minimum and for inhibiting said detecting means upon such a determination until the scan has moved past that portion of the character so that an improper segmentation signal will not be generated during scanning through the enclosed white portion of the character.

3. Analog segmentation apparatus for separating touching characters to facilitate the recognition of characters in a character recognition system comprising:

scanning means for scanning a line of characters with multiple scans transverse to the line of characters and for generating an analog signal for each scan, the analog signal having a different amplitude when the scanning means is crossing a portion of a character than when crossing background;

a plurality N of analog storage means responsive to said scanning means operating serially in time with respect to each other for storing from each of N successive scans a value proportional to the amount of character crossed by said scanning means during each scan, each of said analog storage means for storing the analog value of a scan until reset for storing another analog value of another scan N scans later so that said plurality of storage means at a given time contains the analog values of the N most recent scans;

detecting means responsive to said plurality of analog storage means for detecting in the N most recent scans a pattern of analog values falling to a minimum and then rising and for thereupon generating a segmentation signal, said detecting means including comparing means responsive to said plurality of storage means for comparing the analog values of successive scans and for generating a succession of N−1 comparison signals indicative of whether the analog values from scan to scan are increasing or decreasing, and also including minimum detecting means responsive to said comparing means for detecting in the N−1 successive comparison signals a pattern of decreasing indications followed by increasing indications and for thereupon generating the segmentation signal.

4. Segmentation apparatus for separating touching characters to facilitate the recognition of characters in a character recognition system comprising:

scanning means for scanning a line of characters with multiple scans transverse to the line of characters and for generating a video signal for each scan, the video signal having a different magnitude when the scanning means is crossing a portion of the character then when it is crossing background;

N integrating means operating serially in time with respect to each other, each of said integrating means for integrating the variations in magnitude of the video signal in every Nth scan and for holding the integrated value until reset to receive the video signal from another scan, N scans later;

detecting means responsive to each of said N integrating means for detecting in N successive integrated values a pattern of falling to a minimum and then rising and for generating upon such a detection a segmentation signal.

5. In a character recognition system making multiple scans transverse to a line of characters and generating an analog signal for each scan, analog segmentation apparatus for separating touching characters to facilitate recognition comprising:

first integrating means for integrating the analog signal from each odd numbered scan and holding the integrated value until reset to respond to the next odd numbered scan;

second integrating means for integrating the analog signal from each even numbered scan and holding the integrated value until reset to respond to the next even numbered scan;

comparing means responsive to said first and second integrating means for comparing the integrated values of two successive scans and generating a comparison signal indicative of which scan produced the larger integrated value;

a detecting means responsive to said comparing means for detecting when successive comparison signals indicate the integrated values have decreased and then increased and for thereupon generating a segmentation signal.

6. The apparatus of claim 5 wherein said detecting means comprises:

a memory for storing three successive comparison signals;

monitoring means responsive to said memory for generating a segmentation signal when the three successive comparison signals stored in said memory indicate that in four scans, the integrated values have decreased twice in succession and then increased.

7. The apparatus of claim 5 wherein said detecting means comprises:

slope detecting means responsive to said comparing means for detecting two successive comparison signals indicative of successive increases or decreases in the integrated values and for generating a positive slope signal or a negative slope signal respectively;

a memory responsive to said slope detecting means for storing the negative slope signal until segmentation;

said slope detecting means gated by said memory, when a negative slope signal is absent from said memory, to look for successive comparison signals indicative of successive decreases, and gated by said memory, when a negative slope signal is present in said memory, to look for two successive comparison signals indicative of successive increases;

generating means responsive to said memory and said slope detecting means for generating a segmentation signal when said memory contains a negative slope signal and simultaneously said slope detecting means is generating a positive slope signal.

8. Segmentation apparatus comprising the apparatus of claim 5 and in addition:

inhibiting means for determining when the analog signal represents an enclosed white character and for inhibiting said detecting means upon such a determination until the scan has moved past the enclosed white portion of the character so that an improper segmentation signal will not be generated during scanning through the enclosed white portion of the character.

9. In a character recognition system making multiple scans transverse to a line of characters and generating an analog signal for each scan, analog segmentation apparatus for separating touching characters to facilitate recognition comprising:

four integrating means operating serially in time for integrating the analog signal from each scan, each of said integrating means integrating the analog signal from every fourth scan and holding the integrated value until reset to receive another analog signal from another scan four scans later;

four comparing means for comparing successive scans, each of said comparing means responsive to two of said integrating means for generating a comparison signal indicative of whether the integrated values from two successive scans are increasing or decreasing so that three of the comparison signals represent changes in the integrated values from scan to scan in the four most recent scans;

four detecting means for detecting when three of the comparison signals represent two successive decreases followed by an increase in the integrated values, each of said detecting means responsive to one of the four possible sets of three comparison signals which indicate two successive decreases followed by an increase, each of said detecting means upon detecting the set associated with it generating a segmentation signal.

References Cited

UNITED STATES PATENTS

| | | | |
|---|---|---|---|
| 3,234,511 | 2/1966 | Brust et al. | 340—146.3 |
| 3,309,668 | 3/1967 | Ingham et al. | 340—146.3 |

DARYL W. COOK, Primary Examiner